Jan. 20, 1942.  R. B. BLACKMAN  2,270,644
NEGATIVE IMPEDANCE CIRCUITS
Filed March 18, 1939  2 Sheets-Sheet 1
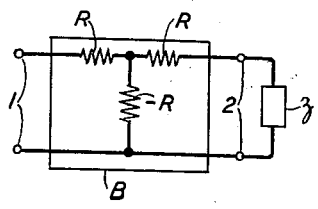
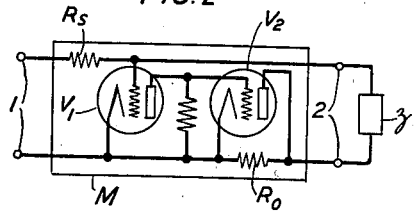
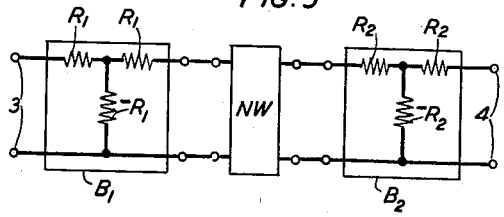
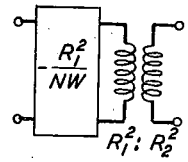
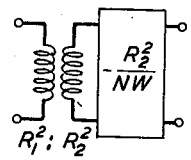
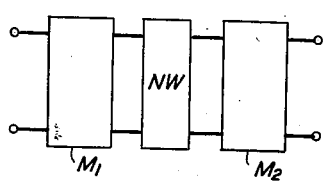
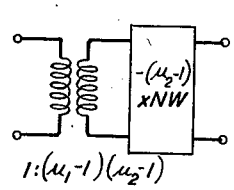
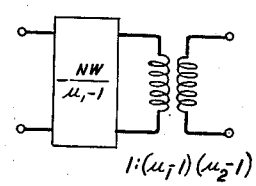
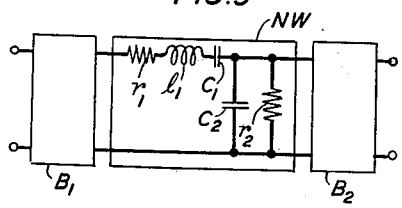
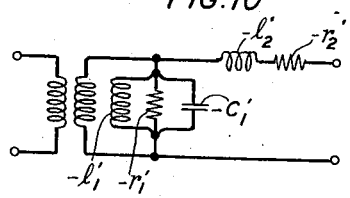
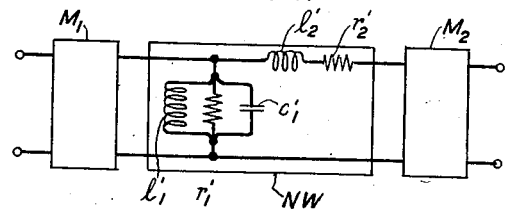
INVENTOR
R. B. BLACKMAN
BY
N. S. Ewing
ATTORNEY Jan. 20, 1942.      R. B. BLACKMAN      2,270,644
NEGATIVE IMPEDANCE CIRCUITS
Filed March 18, 1939       2 Sheets-Sheet 2

INVENTOR
R.B. BLACKMAN
BY
N. A. Ewing
ATTORNEY

Patented Jan. 20, 1942

2,270,644

UNITED STATES PATENT OFFICE 2,270,644

NEGATIVE IMPEDANCE CIRCUITS

Ralph B. Blackman, Cranford, N. J., assignor to Bell Telephone Laboratories, Incorporated, New York, N. Y., a corporation of New York Application March 18, 1939, Serial No. 262,639

10 Claims. (Cl. 178—44)

This invention relates to methods and means for obtaining negative impedances and to applications of such impedances.

Heretofore electrical circuits have been proposed in which there is caused to appear across a pair of terminals an impedance that is the negative or the negative inverse of an impedance comprising real impedance elements connected between a pair of terminals elsewhere in the circuit. R. C. Mathes Patent 1,779,382, October 21, 1930, for example, shows such a two-terminal negative impedance circuit in which the impedance Z presented across the two terminals is a negative multiple $-kz$ of the impedance $z$ of a two-terminal network comprising real impedance elements. A. C. Bartlett's British Patent 278,036, September 26, 1937, shows an example of a two-terminal negative impedance circuit of the inverse type in which the impedance Z presented is $$\frac{-k^2}{z}$$

where $z$ is the impedance of a two-terminal real network. To construct a four-terminal negative impedance network, which comprises a pair of input terminals and a pair of electrically non-identical output terminals, it appears to have been necessary heretofore to provide a separate negative impedance element for each negative impedance branch of the network.

One of the principal objects of the present invention is to reduce the number of negative impedance elements required to form a four-terminal network having a plurality of negative impedance branches.

Another object of the invention is to provide means whereby a four-terminal negative impedance network can be constructed of a pair of negative resistance elements and a single network of real impedance elements.

A further object of the invention is to facilitate impedance matching in electrical circuits.

In accordance with a preferred embodiment of the invention, the foregoing objects and other objects which will appear hereinafter are realized in a circuit comprising a network of real impedance elements interposed in tandem relation between a pair of negative impedance converters. The latter may be, for example, negative impedance transformers, as exemplified by the Mathes patent, supra, or negative impedance inverters as exemplified by the British patent to Bartlett, supra. In the first case the combination is equivalent to the negative of the interposed network or to a negative multiple thereof, and in the other case to the negative inverse of the interposed network.

The nature of the present invention and its various features will appear more fully in the following detailed description of illustrative embodiments of the invention, reference being made to the accompanying drawings, in which:

Figs. 1 and 2 show negative impedance converters of the inverter and transformer types, respectively;

Figs. 3 and 6 show two negative impedance circuits in accordance with the invention; and Figs. 4 and 5 and Figs. 7 and 8, respectively, represent the equivalent circuits thereof;

Figs. 9 to 13 illustrate practical applications of the circuits shown in Figs. 3 and 6;

Referring now to Fig. 1, there is shown an old form of negative impedance converter, a device B operating to present at the terminals 1 an impedance that is a negative function of an impedance $z$ connected across another pair of terminals 2. More particularly, this negative impedance converter B is of the so-called Bartlett type comprising a T-network of resistance elements in which the two series arms comprise equal positive resistances R and in which the shunt arm or stem of the T comprises a negative resistance $-R$ of the same absolute magnitude. The characteristics of the circuit are such that with an impedance $z$ connected across either pair of terminals, the impedance Z appearing at the other pair of terminals is expressible as follows:

$$Z = -\frac{R^2}{z}$$

Figure 14:
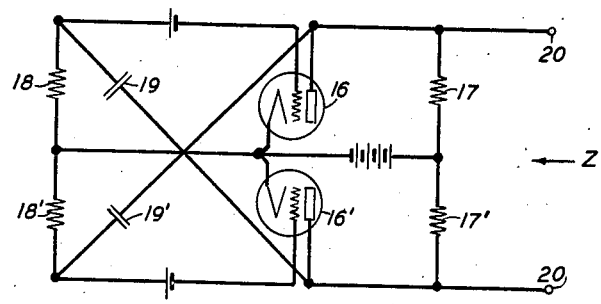
Fig. 14 shows a preferred form of negative resistance circuit.

In other words, the impedance Z is with respect to $R^2$ the negative inverse of the impedance $z$. Such a circuit may accordingly appropriately be termed a negative impedance inverter. For a detailed description of the Bartlett circuit and of its characteristics reference may be made to the British patent to Bartlett, supra, to the paper by Bartlett appearing in the Journal of the Institute of Electrical Engineers, London, volume 65, page 373, 1927, and to the paper by Van der Pol appearing in the Proceedings of the Institute of Radio Engineers, volume 18, page 221, February 1930. It will be understood that the negative resistance —R may be of any suitable form, of which many have been disclosed heretofore. A preferred form is illustrated in Fig. 14.

Fig. 2 shows another typical form of negative impedance converter known to the art. This more particularly is what may be called a negative impedance transformer for the impedance Z appearing at one pair of terminals 1 is equal to $-kz$ where $z$ as before is the impedance connected across the other pair of terminals 2. If the impedance $z$ be connected across the terminals 1 then the impedance Z presented at the terminals 2 is $-k'z$, where $$k' = \frac{1}{k}$$

For a more detailed description of this and other forms of negative impedance converters reference may be made to the Mathes patent, supra, and to H. W. Dudley Patent 1,779,380, October 21, 1930, F. H. Graham Patent 1,779,126, October 21, 1930, and M. Latour Patent 1,687,253, October 9, 1928. The impedance $z$ connected as shown in Fig. 2 corresponds with the impedance element $Z'$, that is, element 21, in the Mathes patent and to the impedance $z$ constituted by transmission line $L_2$ in the Dudley patent. Where, as suggested, the impedance $z$ is connected across the terminals 1 it corresponds to the impedance of the circuit connected to the input terminals in Mathes and Dudley, that is, impedance element Z or 14 in Mathes and impedance Z constituted by line $L_1$ in Dudley. In Fig. 2 is shown a series resistance $R_s$ which is not shown in the circuits of the Mathes and Dudley patents. The purpose of this resistance is to neutralize or offset a negative resistance which appears by reason of the presence of $R_0$ in circuit, where $R_0$ represents the parallel combination of resistances $R_p$ and $R_1$ of the Dudley patent.

In the embodiment of the invention shown in Fig. 3 two negative impedance inverters, such as are illustrated in Fig. 1, are connected in tandem relation with a network of positive impedance elements between them. The two inverters $B_1$ and $B_2$ are indicated as comprising resistance elements of mutually different absolute magnitudes $R_1$ and $R_2$, respectively. The network NW may comprise one or more positive impedance elements arranged in one or more branches and it may therefore be either a two-terminal network or a four-terminal network as hereinbefore defined. I have found it to be a characteristic of the combination shown in Fig. 3 that the impedance presented at either of the terminals 3, 4, is that of a network which is the negative inverse of network NW connected with a transformer of ideal characteristics and of impedance ratio determined by the relative magnitudes of the resistances $R_1$ and $R_2$. More specifically, as indicated in Fig. 4, the circuit shown in Fig. 3 is equivalent to a network which with respect to $R_1^2$ is the negative reciprocal of the network NW followed by a perfect transformer of impedance ratio $R_1^2:R_2^2$. The circuit shown in Fig. 3 is also equivalent to that shown in Fig. 5 which comprises a network which with respect to $R_2^2$ is the negative inverse of network NW preceded by an ideal transformer of impedance ratio $R_1^2:R_2^2$. It will be readily appreciated that if resistors $R_1$ and $R_2$ are equal, the equivalent circuit will comprise a transformer of unity impedance ratio and that hence the transformers may be omitted from the equivalent circuits. Although it is believed to be well understood what is meant by an inverse network, reference is made at this point to the following publications which use the phrase in the same sense: "Communication Engineering" by W. L. Everitt, McGraw Hill Book Company, Inc., 1937, second edition, page 284 ff.; "Transmission Circuits for Telephone Communication" by K. S. Johnson, Van Nostrand Publishing Co., 1925, section 18.1; and "Communication Networks," volume II, by E. A. Guillemin, John Wiley & Sons, Inc., 1935, pages 203 ff. and 252 ff. One network is said to be the negative inverse of another if it is an inverse network modified by changing each impedance element thereof, that is, each inductance, capacitance and resistance, from positive to negative or vice versa. In a simple example where the given network comprises inductive elements in series and capacitive elements in shunt in recurrent order as in a low-pass filter, an inverse network is derivable by replacing each series inductance L with a shunt capacitance $C'$ and each shunt capacitance C with a series inductance $L'$, the magnitudes of the several elements being so related that $Z_L.Z_{C'} = Z_C.Z_{L'} = K$, a constant. The negative of this inverse network is then derivable by replacing each positive impedance element with a negative impedance element of the same magnitude.

Fig. 6 shows schematically another form of the invention which is essentially the same as that shown in Fig. 3 excepting that the negative impedance converters are of the kind illustrated in Fig. 2, viz., negative impedance transformers $M_1$ and $M_2$. I have found that the characteristics of the circuit shown in Fig. 6 are such that the whole is equivalent to a network which is a negative multiple of the network NW of positive impedance elements, followed or preceded by a transformer of ideal transmission characteristics. If in negative impedance transformer $M_1$ the net voltage amplification from the grid of vacuum tube $V_1$ into the plate circuit resistance $R_0$ of vacuum tube $V_2$ be represented by $\mu_1$, and the amplification factor for negative impedance transformer $M_2$ similarly be represented by $\mu_2$ then the circuit is equivalent to those shown in Figs. 7 and 8. The equivalent circuit shown in Fig. 7 comprises a network which is the negative of the impedance network NW with the magnitude of each impedance element modified by the multiplying factor $\mu_2 - 1$, preceded by an ideal transformer having an impedance ratio of $1:(\mu_1-1)(\mu_2-1)$. In the equivalent circuit shown in Fig. 8 the impedance network is the negative of the impedance network NW with each impedance element modified by the multiplying factor $$\frac{1}{\mu_1 - 1}$$

followed by a transformer of the same impedance ratio as the one indicated in Fig. 7. It will be appreciated again that if $\mu_1$ and $\mu_2$ are both equal to 2, the transformers may be dropped from the equivalent circuits and the latter reduced simply to negative impedance networks. It may be stated at this point that the magnitude of series resistance $R_s$ in Fig. 2 is equal to $$\frac{R_0}{\mu-1}$$

Figs. 9 and 10 show in somewhat greater detail an example of the invention similar to the one illustrated in Fig. 3. In Fig. 9 there is interposed in tandem relation between negative impedance inverters $B_1$ and $B_2$ a network NW of the four-terminal type comprising two branches, one a series branch including in series relation a resistance $r_1$, an inductance $l_1$ and a capacitance $c_1$, and the other a shunt branch comprising in parallel relation capacitance $c_2$ and resistance $r_2$. The circuit shown in Fig. 9 is equivalent to that shown schematically in Fig. 10 which comprises a transformer of impedance ratio $$\frac{R_1^2}{R_2^2}$$

as indicated in Fig. 5 and a network of impedance elements which with respect to $R_2^2$ is the negative inverse of the network NW of positive impedance elements. As indicated in Fig. 10, the series branch of network NW becomes a shunt branch comprising in parallel relation negative impedances $-l_1'$, $-r_1'$ and $-c_1'$ and the shunt arm of network NW becomes a series arm including in series relation negative impedances $-l_2'$ and $-r_2'$.

Fig. 11 shows a circuit similar to the one illustrated in Fig. 6, utilizing negative impedance transformers $M_1$ and $M_2$ and an interposed network NW, the circuit being the electrical equivalent of those illustrated in Figs. 9 and 10. In this case, the elements of network NW are negative multiples of the negative impedance elements in the circuit shown in Fig. 10 and therefore comprise positive impedance elements arranged in the same circuit configuration.

It is an important characteristic of any circuit of the general type illustrated in Figs. 3 and 6, for example, that if a positive (or negative) impedance element be connected to either pair of its terminal leads, its impedance will still appear as a positive (or negative) impedance when viewed from the other pair of terminals. That is, the double negative conversion effected by the two negative impedance converters leaves the apparent impedance of the connected element unchanged, at least with respect to its character as a positive or negative impedance and, by appropriate design of the converters, unchanged in any respect.

Figure 12:
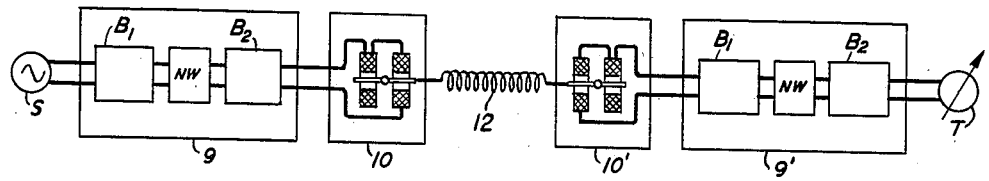

A typical application of the specific circuits shown in Figs. 9 and 11 is illustrated in Fig. 12 where the circuits are utilized to eliminate undesirable reflection effects in an electromechanical transmission system. The electromechanical transmission system chosen for purposes of illustration is that disclosed in R. L. Wegel Patent 1,852,795, April 5, 1932, in which a mechanical spring transmission line 12 is utilized for retarding speech waves. Speech currents from a source S are transmitted to an electromechanical transducer 10 comprising, for example, a loud-speaker element, in which they are translated into mechanical vibrations which are imparted to the spring transmission line 12. Another electromechanical transducer 10' receives the vibrations transmitted over the line 12 and converts them into electrical currents which are then transmitted to a receiver T. For efficient operation impedances should be matched at every point along the system. In this connection it is significant that the electromechanical transducer has a certain electrical resistance and inductance which are electrically in series with the respective circuit leads from the source S and receiver T. Moreover, the mechanical elements of the transducer have a certain mass, stiffness and resistance, each of which has a certain effect on the electrical circuit. On calculation of the gyrostatic mutual, force factor or centrifugal coefficient of the electromechanical transducer, the quantitative relation between mass, stiffness and resistance on the one hand and their effect on the electrical circuit on the other can be determined. These elements may be shown to be equivalent then to a shunt inductance corresponding to the stiffness of the transducer, a shunt capacitance corresponding to the mass, and a shunt resistance corresponding to the mechanical resistance of the transducer. It will be seen, therefore, that each of the electromechanical transducers shown in Fig. 12 has the same characteristics as a network of the kind NW shown in Fig. 11.

Assuming that the respective internal resistances of the source S and receiver T are adjusted to match the resistive characteristic impedance of the transmission line 12, the problem of impedance matching reduces to one of compensating for the characteristics of each of the electromechanical transducers, which characteristics are those of the network NW in Fig. 11. In accordance with the present invention, the desired effect is obtained by inserting between the source S and the electromechanical transducer 10, a negative impedance circuit 9 of the kind shown in either Fig. 9 or Fig. 11 in which the network NW and the negative impedance converters $B_1$ and $B_2$ are proportioned to develop an impedance that is the electrical negative of the impedance of the electromechanical transducer, thereby canceling its effect. A similar circuit 9', with the network NW turned end-for-end, is interposed between the transducer 10' and the receiver T to facilitate impedance matching in this portion of the system. It will be apparent that the electrical resistance of the transducers may comprise all or a part of the proximate series resistors of the impedance inverters.

Figure 13:
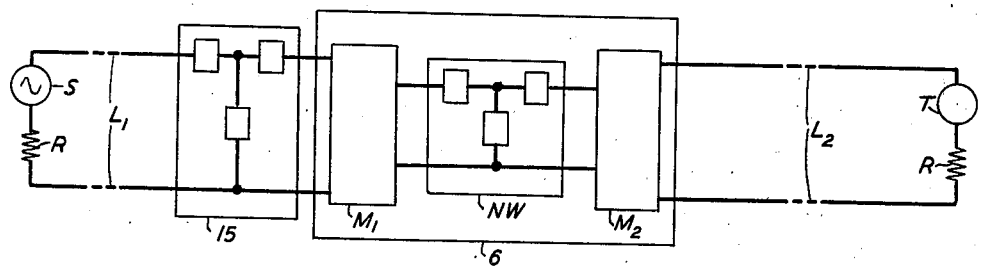

Fig. 13 shows an illustrative embodiment of the invention in which negative impedance circuits are utilized for neutralizing impedance discontinuities in a long transmission system. The source S may represent a telephone subscriber's station at one end of a telephone transmission line $L_1$, having a characteristic impedance R, which leads to a telephone central office. Line $L_2$ may represent another subscriber's line, of the same impedance R, leading to another subscriber's station T. The two transmission lines being of like characteristic impedance and the two subscribers' stations being matched in impedance thereto, signals are transmitted from one station to the other without reflection effects except as such effects may arise from impedance discontinuities in the transmission circuit. Such discontinuities may appear at the central office where auxiliary apparatus and circuits are connected into the through transmission line. In Fig. 13 it is assumed that the auxiliary apparatus and circuits at the central office have the same effect as a T-type impedance network 15. In accordance with the invention, the effect of the discontinuity represented by network 15 is offset or neutralized by insertion of a negative impedance circuit of the type shown in Figs. 3 and 6, for example. If, for specific example, the Fig. 6 type of circuit is employed, the interposed network NW is constructed to duplicate the impedance characteristics of the network 15 turned end-for-end, negative impedance transformers M₁ and M₂ being so constructed that the negative of the impedance network 15 is developed. To verify the fact that impedances are now matched throughout the system, consider transmission in the direction from station S to station T. The impedance looking toward station T at the input terminals of line L₂ is +R. At the input terminals of negative impedance transformer M₂ this resistance appears now as −R. At the input terminals of network NW appears the impedance of the network terminated in −R. At the input of negative impedance transformer M₁ appears the impedance of the negative of the network terminated in +R. At the input of network 15 the insertion characteristic of the latter has offset the characteristic of the negative network so that all that remains is the resistance R, which is the same as the characteristic impedance of the line L₁. Line L₁ is therefore terminated in its characteristic impedance R and there is no reflection for the direction of transmission assumed. A similar study may be made of the conditions for transmission in the opposite direction through the system and again it will be found that line L₂ is terminated in its characteristic impedance and no reflection appears throughout the system.

In accordance with a modification of the invention, the circuit portions 15 and NW in Fig. 13 are interchanged. That is, NW may be understood to represent the impedance discontinuity to be neutralized, in which case network 15 comprises the network of positive impedance elements. With the circuit thus modified the impedance discontinuity is interposed between two negative impedance converters and the compensating network is connected externally of the combination. The compensating network, except as it is turned end-for-end, is of the same circuit configuration as the equivalent circuit of the discontinuity if negative impedance transformers are used, and corresponding elements are of the same magnitudes if the transformers are of unity impedance ratio. Where the converters are negative impedance inverters the external compensating network is the positive inverse of the equivalent circuit of the discontinuity. With either type of converter impedance matching can be obtained, as described hereinbefore with reference to Fig. 13.

Where the stability of any particular combination embodying the circuits of Fig. 3 or 6 is to be studied, one may treat each of the negative impedance converters as a feedback amplifier in which the feedback circuit comprises a part of the other amplifier, and apply Nyquist's rule relating to the stability of feedback circuits.

Where a pure negative resistance is required, as in a network of the kind shown in Fig. 1, for example, the negative resistance circuit shown in Fig. 14 is preferred. This comprises a pair of three-electrode vacuum tubes 16 and 16' connected in push-pull relation and a pair of terminals 20 brought out from the two anodes. The circuit is symmetrical and comprises on each side an anode circuit resistor 17, 17' and a grid circuit resistor 18, 18', and individual biasing batteries in the respective grid leads. A condenser 19, 19', connects each anode to the high potential side of the resistor in the grid circuit of the other tube. The impedance Z which the circuit presents across the terminals 20 can be shown to be as follows:

$$Z = Z' \frac{\left(1 - \frac{kX^2}{R^2_1}\right) + j(1+k)\frac{X}{R_1}}{1 + \left(\frac{kX}{R_1}\right)^2}$$

where $$Z' = -\frac{2}{\frac{\mu-1}{R_0} - \frac{1}{R_1} - \frac{1}{R_2}}$$

$$k = \frac{\frac{1}{R_0} + \frac{1}{R_2}}{\frac{\mu-1}{R_0} - \frac{1}{R_1} - \frac{1}{R_2}}$$

$$X = -\frac{1}{\omega C}$$

$\mu$ = amplification factor
C = capacitance of condensers 19, 19'
R₀ = plate-filament resistance
R₁ = resistance of elements 18, 18'
R₂ = resistance of elements 17, 17'

To a first approximation the reactive component of the impedance Z, when $kX/R_1$ is much less than unity, is of the nature of a series negative capacity:

$$\frac{R_1 C}{(1+k)Z'}$$

This capacity can be neutralized by insertion of a condenser of the same magnitude in series with the terminals 20. The residual reactance is then a negative one:

$$j\frac{2(1+k)}{\frac{1}{R_0}+\frac{1}{R_2}}\frac{\left(\frac{kX}{R_1}\right)^3}{1+\left(\frac{kX}{R_1}\right)^2}$$

which to a first approximation is proportional to $1/\omega^3$. What value of series condenser to use to neutralize the residual reactance will depend on the frequency or frequencies of interest.

Figure 15:
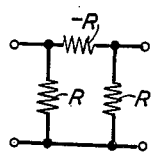
Figs. 15 to 17 represent alternative negative impedance inverter circuits.
Figure 16:
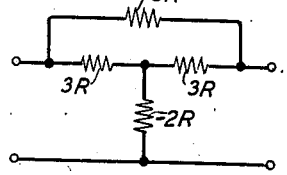
Figure 17:
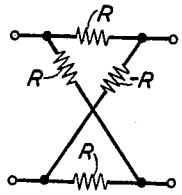

Alternative to the negative impedance inverter illustrated in Fig. 1 are the equivalent inverters shown in Figs. 15, 16 and 17. The circuit shown in Fig. 15 is a π network in which three equal resistors are employed, the series arm being a negative one. Fig. 16 shows an equivalent network that is of the bridged-T configuration, the shunt arm being a negative resistance which may be grounded at the lower extremity, and the several arms being proportioned as indicated in Fig. 16. Fig. 17 shows an equivalent circuit of the lattice type in which one of the cross-arms is a negative resistance and the other three arms are positive resistances of the same magnitude. One or another of these four negative impedance inverter circuits may be preferred in a particular case.

Inasmuch as various other embodiments of the invention will occur to those skilled in the art, the specific circuits herein disclosed are to be considered as illustrative only, the scope of the invention embracing such other embodiments as come within the spirit and terms of the appended claims.

What is claimed is:

1. In an electrical circuit, a three-unit four-terminal impedance converting combination comprising a four-terminal network having at least three distinct positive impedance branches, and only two negative impedance elements in circuit combination with said network, said impedance converting combination being electrically equivalent to a four-terminal network having more than two negative impedance branches.

2. A unitary three-element impedance conversion device comprising as the elements thereof a pair of four-terminal negative impedance units and a four-terminal network of positive impedance elements interposed in tandem circuit relation between said units, each of said units having input and output terminals and each being of such character that the impedance presented by its input terminals is a negative impedance function of whatever impedance is connected to its output terminals, said function consisting of the product of other functions only one of which involves said connected impedance and said one function involving only said connected impedance, said unitary device being equivalent to a four-terminal network having elements that with respect to impedance are negatives of corresponding elements of said interposed network.

3. A combination in accordance with claim 2 in which said units are negative impedance transformers.

4. A combination in accordance with claim 2 in which said units are negative impedance inverters.

5. A combination in accordance with claim 2 in which said interposed network consists of positive lumped impedance elements.

6. A combination in accordance with claim 1 in which said network consists of real, lumped impedance elements.

7. In combination, an electrical signal transmission circuit, said circuit having an impedance discontinuity substantially localized at a point thereof, the impedance presented by said circuit in each direction from said discontinuity being real, and means compensating for said discontinuity comprising a pair of negative impedance converters and a network of positive impedance elements in tandem circuit relation between said converters, said means being electrically adjacent said discontinuity.

8. A combination in accordance with claim 7 in which said network is a four-terminal network.

9. In combination, an electrical circuit having an impedance discontinuity therein and presenting real impedance in both directions from said discontinuity, a network of positive impedance elements electrically equivalent to said discontinuity and interposed in said circuit in the vicinity of said discontinuity, and a pair of negative impedance converters electrically enclosing either said impedance discontinuity or said network, said network being so proportioned that said discontinuity is substantially neutralized.

10. In combination in an electrical circuit a portion of which has the characteristics of a mismatched four-terminal network of positive impedance elements, another circuit portion electrically-adjacent and tandem-related to said first-mentioned circuit portion and having the characteristics of a four-terminal network the configuration and components of which are systematically related to the configuration and components of said first-mentioned network, and a pair of four-terminal negative impedance units one on each side of and electrically substantially contiguous with one of said circuit portions, each of said negative impedance units being of such character that the impedance presented at one pair of its terminals is a negative impedance function of only the impedance connected to the other pair of its terminals and a constant real factor, said pair of negative impedance units and said one circuit portion together being equivalent to a four-terminal network having elements that with respect to impedance are negatives of corresponding elements of said first-mentioned network.

RALPH B. BLACKMAN.